No. 872,270. PATENTED NOV. 26, 1907.
J. N. BELLINGER.
SNAP HOOK.
APPLICATION FILED JULY 22, 1907.

Witnesses
J. J. Walsh Jr.
L. B. Bridges

Inventor
John N. Bellinger
By Davis & Davis
Attorneys

UNITED STATES PATENT OFFICE.

JOHN N. BELLINGER, OF CASA, ARKANSAS.

SNAP-HOOK.

No. 872,270.  Specification of Letters Patent.  Patented Nov. 26, 1907.

Application filed July 22, 1907. Serial No. 384,848.

*To all whom it may concern:*

Be it known that I, JOHN N. BELLINGER, a citizen of the United States of America, and resident of Casa, county of Perry, State of Arkansas, have invented certain new and useful Improvements in Snap-Hooks, of which the following is a full and clear specification, reference being had to the accompanying drawing, in which—

Figure 1:
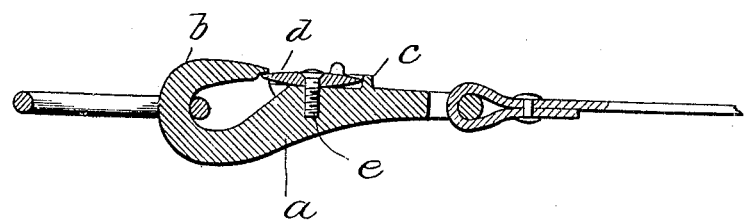
Figure 2:
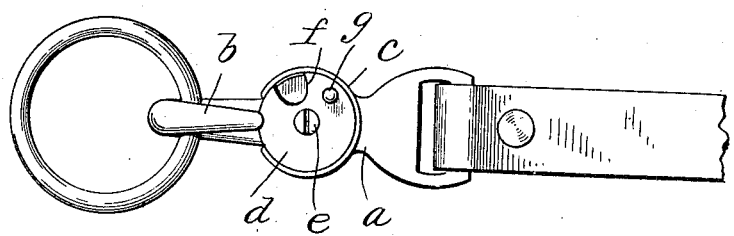

Figure 1 is a vertical longitudinal section; and Fig. 2 a plan view of my improved snap hook.

The object of this invention is to provide a springless snap-hook which shall be exceedingly simple in construction and will be reliable in action, as more fully hereinafter set forth.

Referring to the drawings annexed by reference characters, $a$ designates the main body of the hook which at one end is provided with an upturned portion $b$ which extends backwardly toward the main body of the device and thus forms the hook for engagement with the ring or other device. The rear portion of the body is flattened and provided with a transverse slot to permit its attachment to a strap. The body between the strap engaging loop and the hook is broadened into a disk-like portion which is provided with an upturned flange $c$ which forms a sort of cup for the reception and protection of a disk $d$ which is rotatively fastened down on the body of the device by means of a central screw $e$ which passes down through the center of the disk and into the body of the hook.

At a point in the edge of the disk it is provided with an inwardly extending notch $f$ and on its face with an operating knob $g$. The disk is of such size and is so positioned on the body that its edge engages under the projecting end of the hook $b$ and thus closes the entrance to said hook. To open the entrance to said hook it is simply necessary to turn the disk sufficiently to bring notch $f$ coincident with the end of the hook, thus permitting a ring to be readily passed into the hook or detached from the hook.

It will be observed that the disk lies in a plane at right angles to the plane of the hook so that by its engagement under the extremity of the hook the ring is securely locked within the hook.

The central screw $e$ may be tightened sufficiently from time to time to give the proper tension or friction to the disk so that it will not turn too easily. The cup like receptacle for the disk prevents it not only from being disturbed from its adjustment but also prevents it being injured. To reduce the friction and wear the under side of the disk is convexed so that it has a bearing only at its center. By placing the handle or lug $g$ at the outer edge of the disk ample leverage is obtained to enable the disk to be turned even though it be stuck or too tightly clamped.

Having thus fully described my invention, what I claim as new and desire to secure by Letters Patent, is—

1. A snap hook whose body portion is provided at one end with an open hook and at its other end with a strap-engaging part and midway its ends with a disk-like body portion having a marginal flange extending upwardly to form a cup, a disk pivoted in this cup and having its edge adjacent to the end of the hook and provided with an inwardly extending notch, for the purpose set forth.

2. A snap-hook having a strap-engaging part at one end and an open hook at the other end and a broadened body portion between such parts, a disk centrally pivoted on said broadened body portion and having its circular edge engaging the extremity of the hook, said circular edge being provided with a notch adapted to be adjusted coincident with the end of the hook and thus open the hook, the bottom of the disk being convex and the pivot of the disk being a screw passed down through the disk and threaded into the body of the snap-hook, for the purpose set forth.

In testimony whereof I hereunto affix my signature in the presence of two witnesses this 16 day of July 1907.

JOHN N. BELLINGER.

Witnesses:
S. L. WATERS,
R. C. CHAPPELL.